United States Patent

Tanaka et al.

[11] Patent Number: 6,115,173
[45] Date of Patent: Sep. 5, 2000

[54] OPTICAL AMPLIFYING TRANSMISSION SYSTEM AND OPTICAL AMPLIFIER

[75] Inventors: Keiji Tanaka; Noboru Edagawa; Shu Yamamoto, all of Tokyo, Japan

[73] Assignee: KDD Corporation, Tokyo, Japan

[21] Appl. No.: 09/206,911

[22] Filed: Dec. 7, 1998

[30] Foreign Application Priority Data

Dec. 11, 1997 [JP] Japan ................................. 9-341111

[51] Int. Cl.$^7$ ........................................... H01S 3/00
[52] U.S. Cl. ........................ 359/333; 359/341; 359/161; 359/174
[58] Field of Search .................... 359/341, 124, 359/161, 174, 176, 333, 326

[56] References Cited

U.S. PATENT DOCUMENTS

| | | | |
|---|---|---|---|
| 5,696,614 | 12/1997 | Ishikawa et al. | 359/124 |
| 5,777,770 | 7/1998 | Naito | 359/179 |
| 5,877,781 | 3/1999 | Miyauchi et al. | 359/161 |
| 5,940,207 | 8/1999 | Weich et al. | 359/333 |
| 5,991,477 | 11/1999 | Ishikawa et al. | 385/24 |
| 6,043,914 | 3/2000 | Cook et al. | 359/124 |

*Primary Examiner*—Mark Hellner
*Attorney, Agent, or Firm*—Christie, Parker & Hale, LLP

[57] ABSTRACT

In an optical fiber transmission line between two terminal stations, an input side wavelength converter for up-shifting a wavelength of a signal light is inserted at a front part of each of the optical amplifiers and an output side wavelength converter for down-shifting a wavelength of a signal light is inserted at a rear step of the optical amplifiers. Signal lights transmit in a wavelength band shorter or longer than the zero dispersion wavelength of the transmission optical fiber on said transmission optical fibers. The input side wavelength converter converts the wavelength of the signal lights from the transmission optical fibers within the amplifying bandwidth of the optical amplifiers and the output side wavelength converter returns the wavelength of the signal lights optically amplified by the optical amplifiers.

28 Claims, 5 Drawing Sheets

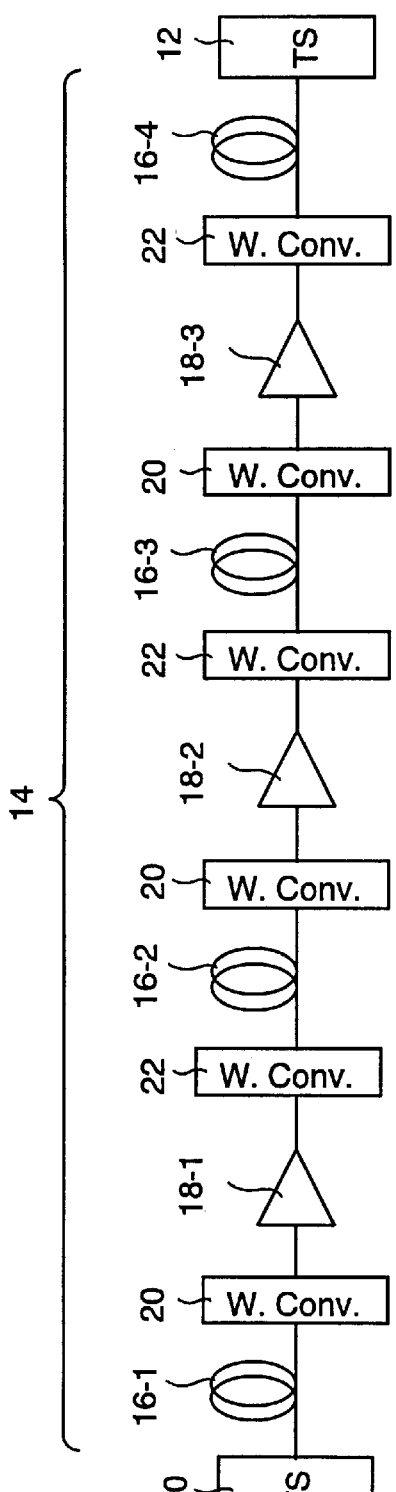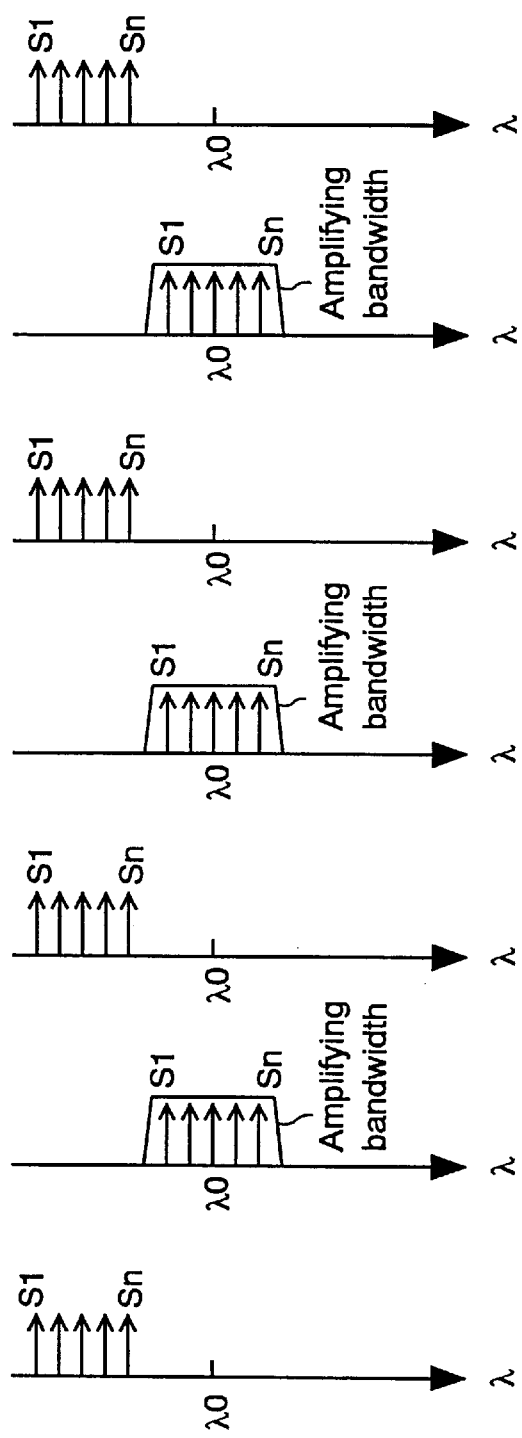
Fig.1(a)
Fig. 1 (b)

OPTICAL AMPLIFYING TRANSMISSION SYSTEM AND OPTICAL AMPLIFIER

FIELD OF THE INVENTION

This invention relates to an optical amplifying transmission system and an optical amplifier, and more specifically, to an optical amplifying transmission system for optically amplifying and transmitting a wavelength-division-multiplexed light and an optical amplifier therefor.

BACKGROUND OF THE INVENTION

In a single wavelength optical fiber transmission which was used prior to the establishment of a wavelength division multiplexing transmission system, a zero dispersion transmission had been generally considered to be preferable. Therefore, most of optical fiber transmission lines in use are designed so that a zero dispersion wavelength becomes a center of an amplifying a bandwidth of an optical amplifier.

Furthermore, in an optical transmission system designed for a wavelength division multiplexing transmission, each signal wavelength to be wavelength-division-multiplexed is usually set up so that it is contained within an amplifying bandwidth of an optical amplifier and, at the same time, it is also contained within a transmission bandwidth of an optical fiber. It is generally designed that an amplifying bandwidth of an optical amplifier coincides with a transmission bandwidth of an optical fiber.

When to use an existing optical fiber transmission line designed for a single wavelength transmission, the following problems would arise due to the smallness of a wavelength dispersion value of a signal wavelength. That is, the effect of Four Wave Mixing occurs extremely prominent and, thus, interference between channels greatly increases. It is difficult to increase the number of multiplexed wavelengths since enlarging the wavelength dispersion value is impossible. Furthermore, as the wavelength dispersion value is small, the difference of the wavelength dispersion value caused by a dispersion slope considerably affects transmission characteristics of each signal.

Even if an optical fiber transmission line suitable for a wavelength division multiplexing transmission is prepared without using the existing optical fiber transmission line, there still would be some problems as follows. It is preferable to make a channel interval of each signal as narrow as possible since a bandwidth of an optical amplifier is limited. However, on an optical fiber transmission line, there is the interaction between channels such as XPM (Cross Phase Modulation) and FMW, and, therefore, it is preferable to have a channel interval as wide as possible. Conventionally, a channel interval has been determined by an optical fiber transmission line and the number of multiplexed wavelengths by a bandwidth of an optical amplifier. To increase the number of channels in a wavelength division multiplexing system, up to the present, means for extending an amplifying bandwidth of an optical amplifier has been employed.

SUMMARY OF THE INVENTION

An object of the present invention is to provide an optical amplifying transmission system and an optical amplifier that can obtain satisfactory transmission characteristics in a wavelength division multiplexing transmission even though an existing optical fiber transmission line is used.

A further object of the present invention is to provide an optical amplifying transmission system and an optical amplifier which are capable of multiplexing a great many wavelengths.

In an optical amplifying transmission system according to the invention, optical amplifying/repeating means for repeating and connecting a plurality of optical fiber transmission lines comprises an optical amplifier, an input side wavelength converter for wavelength-converting an inputting signal light within the amplifying bandwidth of said optical amplifier, and an output side wavelength converter for wavelength-converting a signal light output from said optical amplifier within the transmission bandwidth on said optical fiber transmission line. This structure makes it possible that a transmission bandwidth on an optical fiber transmission line and an amplifying bandwidth of an optical amplifier can be used separately. In other words, according to each characteristics of an optical fiber transmission line and an optical amplifier, a wavelength of a signal light and the number of multiplexed wavelengths can be flexibly determined and, as a result, better transmission characteristics can be easily realized.

By making a transmission bandwidth on an optical fiber transmission line to locate in a wavelength band being apart from a zero dispersion wavelength of a transmission optical fiber used for an optical fiber transmission line, even if an optical fiber transmission line and an optical amplifier which have been designed and laid for a single wavelength are used, the amplifying bandwidth of the optical amplifier can be used as it is for optical amplification, keeping the transmission bandwidth of the optical fiber transmission line to be apart from the zero dispersion wavelength. Since a large wavelength dispersion value can be applied, it is possible to decrease the influence of four-wave mixing, and also the number of multiplexed wavelengths can be increased by narrowing a wavelength interval. Furthermore, the difference of the wavelength dispersion values of respective signals resulted from the influence of the dispersion slope becomes relatively small and, therefore, the number of multiplexed wavelengths can be increased by widening the available wavelength band.

By making the wavelength converting direction of the output side wavelength converter opposite to that of the input side wavelength converter, a wavelength band of a signal light on the optical fiber transmission line is settled and so an existing wavelength division multiplexing transmission technique can be easily employed.

Optical amplifying/repeating means comprises a first optical amplifying repeater wherein an input side wavelength converter and an output side wavelength converter wavelength-convert a signal light into a first wavelength direction as well as either of the input side wavelength converter or the output side wavelength converter reverses the order of wavelength direction of the wavelength-division-multiplexed signal light, and a second optical amplifying repeater wherein the input side wavelength converter and the output side wavelength converter wavelength-convert the wavelength of the signal light into a second wavelength direction opposite to the first wavelength direction as well as either of the input side wavelength converter or the output side wavelength converter reverses the order of wavelength direction of the wavelength-division-multiplexed signal light. By arranging said first optical amplifying repeater and said second optical amplifying repeater alternately, the accumulative wavelength dispersion of each of a plurality of wavelength-division-multiplexed signal lights is offset mutually on each optical fiber transmission line and, as a result, the accumulative wavelength dispersion becomes small without inserting a dispersion compensation fiber.

Providing that the input side wavelength converter compresses the bandwidth occupied by the inputting wavelength-division-multiplexed signal lights and the output side wavelength converter expands the bandwidth occupied by the wavelength-division-multiplexed signal lights output from the optical amplifier, the channel intervals on the optical fiber transmission line are relatively widened, the interference between channels is reduced, and, consequently, transmission characteristics is improved.

BRIEF DESCRIPTION OF THE DRAWINGS

FIG. 1(a) is a schematic block diagram showing a first embodiment of the invention;

FIG. 1(b) shows wavelength positions of signal lights at respective parts;

DESCRIPTION OF THE PREFERRED EMBODIMENTS

Figure 2:
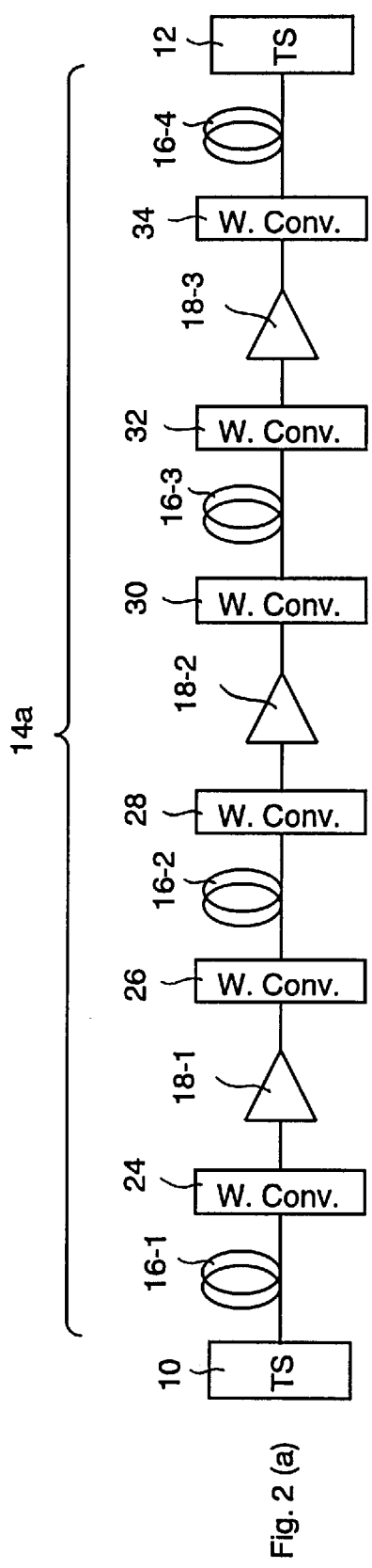
FIG. 2(a) is a schematic block diagram showing a second embodiment of the invention.
FIG. 2(b) shows wavelength bands of signal lights at respective parts.
Figure 2:
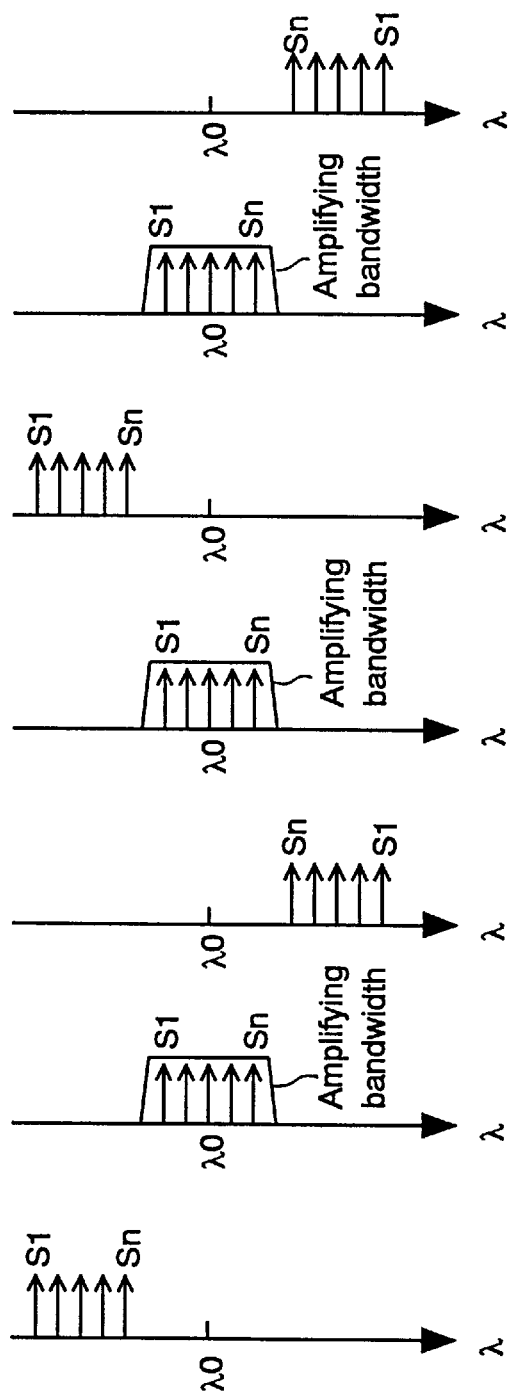

Some embodiments of the invention are explained below in detail with reference to the drawings.

FIG. 1(a) is a schematic block diagram showing a first embodiment of the invention when the invention is applied to an existing optical fiber transmission line designed for single wavelength and FIG. 1(b) shows wavelength positions of signal lights at respective parts. In FIG. 1(b), the vertical axis and the horizontal axis respectively show a wavelength and the optical intensity.

In an optical fiber transmission line 14 positioned between terminal stations 10 and 12, transmission optical fibers 16-1~16-4 and optical amplifiers 18-1~18-3 were designed and laid for a single wavelength transmission. In the embodiment, a wavelength converter 20 for up-shifting a wavelength of a signal light is inserted at a front part of the respective optical amplifiers 18-1~18-3, and a wavelength converter 22 for down-shifting a wavelength of a signal light is inserted at a rear part of the respective optical amplifiers 18-1~18-3. The wavelength converter 20, one of the optical amplifiers 18-1~18-3 and the wavelength converter 22, as a whole, compose an optical amplifying repeater.

Supposing the zero dispersion wavelength of the transmission optical fibers 16-1~16-4 is λ0, in the embodiment, the wavelength-division-multiplexed lights composed of signal lights S1~Sn are transmitted in a wavelength band shorter than the zero dispersion wavelength λ0 on the transmission optical fibers 16-1~16-4. The wavelength converter 20 then converts or shifts the wavelength of the signal lights from the transmission optical fibers 16-1~16-4 so as to fit within the amplifying bandwidth of the optical amplifiers 18-1~18-3. By this function, respective signal lights S1~Sn are, without any trouble, optically amplified within the optical amplifying bandwidth. The signal lights S1~Sn, which were optically amplified at the optical amplifiers 18-1~18-3, are converted or shifted by the wavelength converter 22 into a predetermined wavelength band shorter than the zero dispersion wavelength λ0 and enter the following transmission optical fibers 16-2~16-4.

According to the above-mentioned structure, by using the conventional optical fibers 16-1~16-4 and optical amplifiers 18-1~18-3 arranged and laid for a single wavelength, a plurality of signal lights of different wavelengths can be transmitted by a wavelength division multiplexing transmission without any difficulty. On the transmission optical fibers 16-1~16-4, because a signal light transmits in a wavelength band apart from the zero dispersion wavelength λ0, the influence of FWM decreases. When the influence of FWM decreases, it becomes possible to narrow the wavelength interval and, thus, the degree of wavelength multiplexing can be increased. Furthermore, as the wavelength dispersion value increases, the influence of a dispersion slope relatively decreases.

Because the signal lights S1-Sn are transmitted in a wavelength band apart from the zero dispersion wavelength λ0, wavelength dispersion is accumulated. The accumulated wavelength dispersion, however, can be settled by inserting a dispersion compensative fiber at an appropriate part.

In the embodiment shown in FIG. 1, although each signal light transmits in the wavelength band shorter than the zero dispersion wavelength λ0 on each of transmission optical fibers 16-1~16-4, it can also transmit either in a wavelength band longer than the zero dispersion wavelength λ0 and in a wavelength wherein a wavelength shorter than the zero dispersion wavelength and a wavelength longer than the zero dispersion wavelength are combined mutually. FIG. 2(a) is a schematic block diagram of a modification of the first embodiment and FIG. 2(b) shows wavelength bands of signal lights at respective parts. The same elements as those of FIGS. 1(a) and 1(b) are labeled with common reference numerals. In an optical fiber transmission line 14a, compared to the optical fiber transmission line 14, the wavelength converters 20 and 22 are modified to wavelength converters 24~34.

The first wavelength converter 24, similar to the embodiment shown in FIG. 1, wavelength-converts respective signal lights S1~Sn from the transmission optical fiber 16-1 within the amplifying bandwidth of the optical amplifier 18-1. The wavelength converter 26 wavelength-converts respective signal lights S1~Sn optically amplified by the optical amplifier 18-1 into a wavelength band longer than the zero dispersion wavelength λ0 by reversing their wavelength relations. Namely, the wavelength converter 26 wavelength-converts respective signal lights S1~Sn so that a signal light positioned at a short wavelength side on the transmission optical fiber 16-1 should be located at a long wavelength side on the transmission optical fiber 16-2. Accordingly, for instance, a signal light which received plus dispersion on the transmission optical fiber 16-1 would receive the almost equivalent amount of minus dispersion and, hence, the accumulative wavelength dispersion of the signal light while it transmits on two transmission optical fibers 16-1 and 16-2 becomes practically zero.

The next wavelength converter 28 wavelength-converts the signal lights S1~Sn from the transmission optical fiber 16-2 conversely to the wavelength converter 26. Accordingly, the signal lights S1~Sn enter within the amplifying bandwidth of the optical amplifier 18-2 as well as showing the same order to the wavelength as first one, and each signal light is optically amplified in the same gain. The wavelength converter 30 wavelength-converts the signal lights S1~Sn output from the optical amplifier 18-2 into a wavelength band shorter than the zero dispersion wavelength λ0, keeping their order to the wavelength. The output of the wavelength converter 30 enters the wavelength converter 32 after transmitting on the transmission optical fiber 16-3. The wavelength converter 32, similar to the wavelength converter 24, converts wavelengths of the inputting signal lights S1~Sn within the amplifying bandwidth of the optical amplifier 18-3 and the wavelength converter 34, similar to the wavelength converter 26, converts or shifts wavelengths of the signal lights S1~Sn output from the optical amplifier 18-3. The signal lights S1~Sn output from the wavelength converter 34 enter the terminal station 12 after transmitting on the transmission optical fiber 16-4.

In the embodiment shown in FIG. 2, addition to the merits shown in FIG. 1, there is an effect to control the accumulative wavelength dispersion small, because this structure makes it possible to appropriately dispose a normal dispersion region and an anomalous dispersion region (preferably to dispose them alternately). If the accumulative wavelength dispersion is compensated frequently around the zero, there is a possibility that the influence of FWM occurs. However, the influence of FWM can be controlled by leaving the accumulative wavelength dispersion of a certain amount and making uneven the ratio of arranging the wavelength converters which convert the signal lights into a wavelength shorter than the zero dispersion wavelength λ0 and the wavelength converters which convert the signal lights into a wavelength longer than the zero dispersion wavelength to expand a dispersion compensative interval.

The wavelength converters 20, 22, 24, 26, 28, 30, 32, and 34 can be realized, for example, using the nonlinear optical effect such as DFG(Difference Frequency Generation) and FWM, the principle of electroacoustic frequency shifter and an electro-absorption modulator or a semiconductor laser amplifier. Moreover, it is also possible to combine them. Consequently, a wavelength shift of 20~30 nm can be realized.

The wavelength converters 20, 22, 24, 26, 28, 30, 32, and 34 of the above-mentioned embodiment convert the wavelengths of the respective signal lights S1~Sn keeping their wavelength intervals fixed. That is, the wavelength intervals between the adjacent signal lights S1~Sn are equivalent on the transmission optical fibers 16-1~16-4 and in the optical amplifiers 18-1~18-3. However, the wavelength intervals between the adjacent signal lights S1~Sn in the optical amplifiers 18-1~18-3 can be narrower than that on the transmission optical fibers 16-1~16-4. It is preferable to have wider intervals on the transmission optical fibers 16-1~16-4 because there is the influence of the interaction between the channels such as XPM and FWM to deteriorate the transmission characteristics. On the other hand, there is no such influence in the optical amplifiers 18-1~18-3 and it is preferable to have narrower channel intervals in view of the effective use of the optical amplifying bandwidth and the evenness of the gain. Furthermore, on the occasion of the wavelength conversion, the wavelength converters 20, 24, 28 and 32 comprise the bandwidth compressive function for narrowing the channel wavelength intervals and, on the other hand, the wavelength converters 22, 26, 30 and 34 comprise the bandwidth expansive function for widening the wavelength intervals between the adjacent channels.

Figure 3:
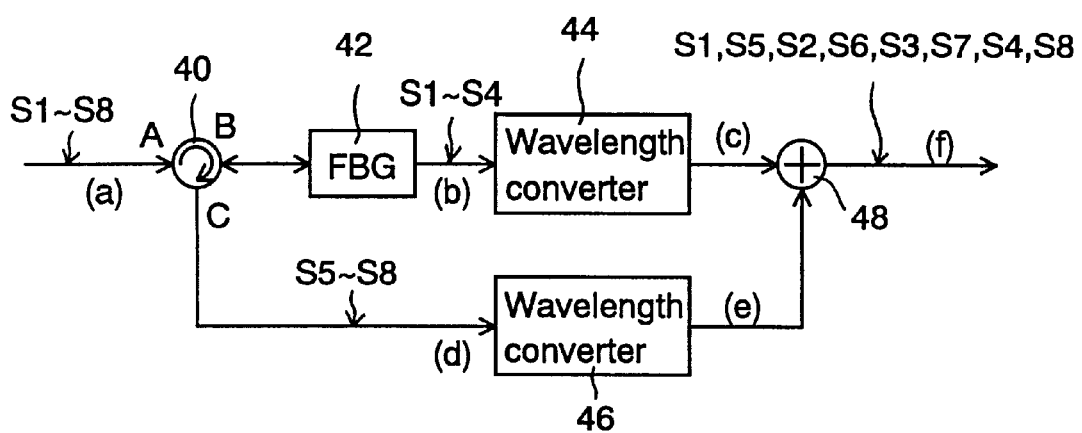
FIG. 3 is a schematic block diagram showing a wavelength converter having a bandwidth compressive function.

To realize the bandwidth compressive function, there is a method for narrowing channel intervals by wavelength-separating a wavelength-division-multiplexed light into each signal light and converting each signal light individually into a desired wavelength within a intended wavelength band. However, it is also obtained as a circuit structure shown in FIG. 3. In FIG. 3, eight signal lights S1~S8 should be wavelength-division-multiplexed.

An optical circulator 40 is an optical element for outputting an input light of a port A from a port B and an input light of the port B from a port C. Wavelength-division-multiplexed light of eight signals enters the port A. An optical fiber grating 42 for selectively reflecting the wavelengths of the signal lights S5~S8 is connected to the port B of the optical circulator 40. The other end of the optical fiber grating 42 is connected to a wavelength converter 44 for wavelength-converting or wavelength-shifting, in a lump, the signal lights S1~S4 transmitted through the optical fiber grating 42. A wavelength converter 46 for wavelength-converting or wavelength-shifting the signal lights S5~S8 in a lump connects to the port C of the optical circulator 40. A multiplexer 48 multiplexes, namely wavelength-multiplexes, output lights of the wavelength converters 44 and 46.

FIGS. 4(a)~4(f) show the signal wavelength distribution of each part shown in FIG. 3. FIG. 4(a) shows the signal wavelength distribution of an input light of the port A of the optical circulator 40, FIG. 4(b) shows that of an input light of the wavelength converter 44, FIG. 4(c) shows that of an output light of the wavelength converter 44, FIG. 4(d) shows that of an input light of the wavelength converter 46, FIG. 4(e) shows that of an output light of the wavelength converter 46 and FIG. 4(f) shows that of an output light of the multiplexer 48.

The wavelength-division-multiplexed signal lights S1~S8 (FIG. 4(a)) input the port A of the optical circulator 40 and enter the optical fiber grating 42 from the port B. The signal lights S1~S4 (FIG. 4(b)) are applied to the wavelength converter 44 after transmitting the optical fiber grating 42 and, on the other hand, the signal lights S5~S8 (FIG. 4(d)) are reflected by the fiber grating 42, input to the port B of the optical circulator 40 and applied to the wavelength converter 46 from the port C. The wavelength converter 44 wavelength-shifts the inputting signal lights S1~S4 (FIG. 4(b)) in a lump into the wavelength band shown in FIG. 4(c) and the wavelength 46 wavelength-shifts the inputting signal lights S5~S8 (FIG. 4(d)) in a lump into the wavelength band shown in FIG. 4(e). In such a case, the wavelength shifting amount of the wavelength converters 44 and 46 is adjusted so that the signal lights S5~S8 are settled at intervals of the signal lights S1~S4 after wavelength-shifts. The multiplexer 48 multiplexes, namely wavelength-multiplexes, outputs of the wavelength converters 44 and 46 and then outputs them. In the output light of the multiplexer 48, the signal lights S1~S8 are lined S1, S5, S2, S6, S3, S7, S4 and S8 in that order and the channel intervals are compressed into half of the original intervals.

Figure 5:
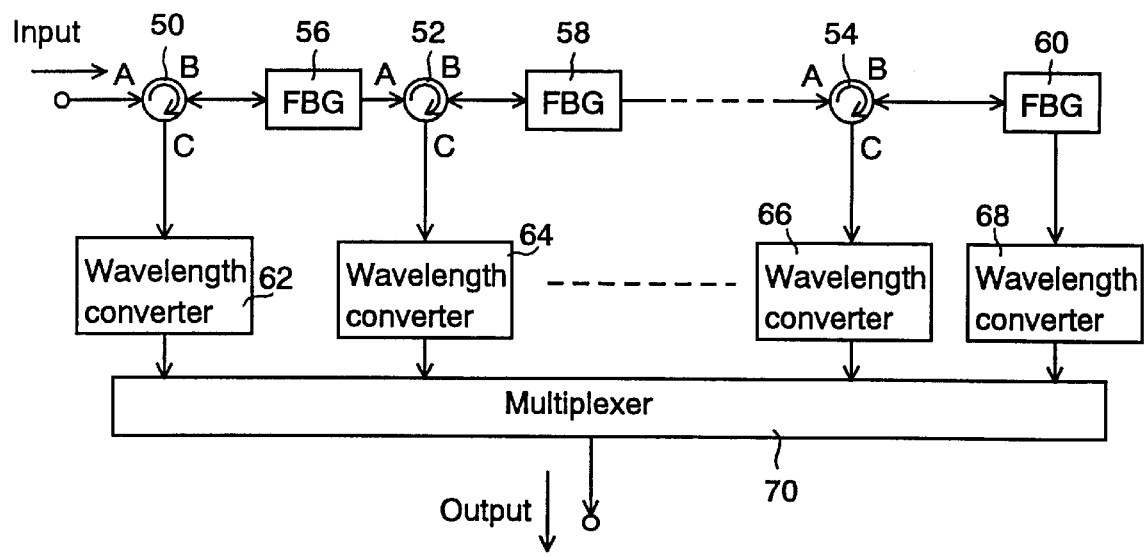
FIG. 5 is a schematic block diagram of a wavelength converter having bandwidth compressive and expansive functions.

The bandwidth expansive function equipped for the wavelength converters 22, 26, 30 and 34 can be realized, for example, as a circuit structure shown in FIG. 5. According to the circuit structure that optical circulators 50, 52 and 54 and optical fiber gratings 56, 58 and 60 for selectively reflecting desired wavelengths are connected in series, a signal light having each wavelength is separated from input light and then each signal light is shifted into a desired wavelength by wavelength converters 62, 64, 66 and 68. A multiplexer 70 multiplexes, namely wavelength-multiplexes, output lights of the wavelength converters 62, 64, 66 and 68. It is obvious that the commonly known arrayed waveguide gratings and optical filters can be used for the alternative to the parts of the optical circulators 50, 52 and 54 and the optical fiber gratings 56, 58 and 60. The arrayed waveguide grating can be also used as the multiplexer 70.

Figure 4:
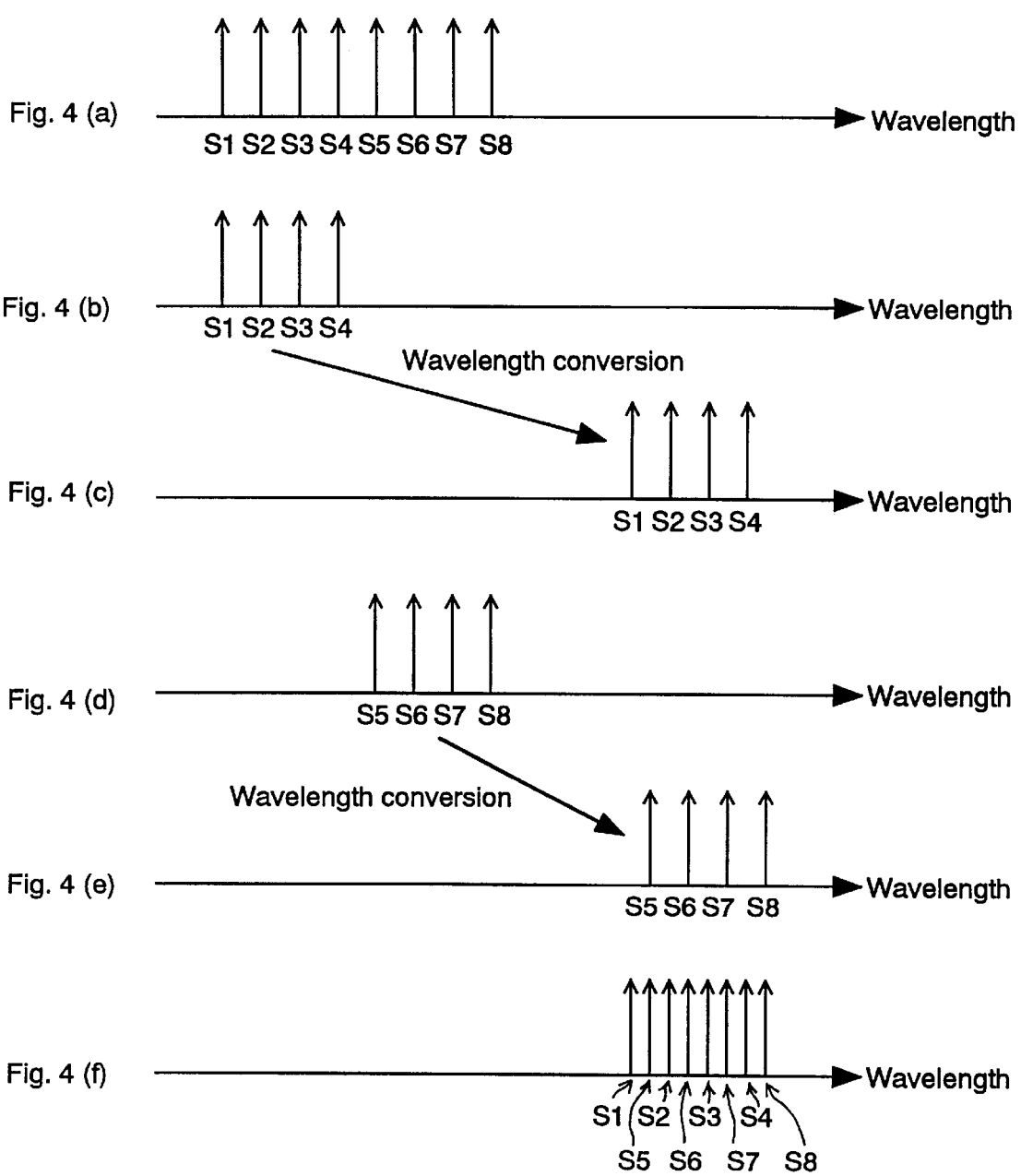
FIG. 4(a)~(f) are wavelength distribution maps of signal lights at respective parts of the apparatus shown in FIG. 3.

As shown in FIGS. 3 and 4, if a plurality of signal lights are grouped and wavelength-converted in a lump on the bandwidth compression, a separated signal light can be multiplexed in a same group and then wavelength-converted in a lump on the wavelength expansion. As a result, the number of wavelength converters can be decreased.

As the circuit structure shown in FIG. 5 represents an all-purpose structure of the wavelength conversion, it is obviously usable for the bandwidth compression by adjusting the wavelength shifting amount of the wavelength converters 62, 64, 66 and 68.

As readily understandable from the above description, according to the invention, even if a conventional optical fiber transmission line which was arranged and laid for a single wavelength transmission is used, satisfactory transmission characteristics can be obtained in a wavelength division multiplexing transmission. As a transmission bandwidth of an optical fiber transmission line and an amplifying bandwidth of an optical amplifier can be determined individually, the system design can be more flexible, and excellent transmission characteristics can be obtained even on an optical fiber transmission line designed and laid for a wavelength division multiplexing transmission.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical amplifying transmission system composed of a plurality of optical fiber transmission lines which are repeated and connected by optical amplifying/repeating means wherein said optical amplifying/repeatting means comprises an optical amplifier, an input side wavelength converter for wavelength-converting an inputting signal light within an amplifying bandwidth of said optical amplifier and an output side wavelength converter for wavelength-converting a signal light output from said optical amplifier within a transmission bandwidth on said optical fiber transmission line.

2. The optical amplifying transmission system as defined in claim 1 wherein said transmission bandwidth on said optical fiber transmission line is apart from the zero dispersion wavelength of a transmission optical fiber used for said optical fiber transmission line.

3. The optical amplifying transmission system as defined in claim 2 wherein the wavelength conversion direction of said output side wavelength converter is the reverse of that of said input side wavelength converter.

4. The optical amplifying transmission system as defined in claim 2 wherein said optical amplifying/repeating means comprises a first optical amplifying repeater for wavelength-converting a signal light into a first wavelength direction using said input side wavelength converter and said output side wavelength converter as well as one of said input side wavelength converter and said output side wavelength converter reverses the order of the wavelength direction of a wavelength-division-multiplexed signal light and a second optical amplifying repeater for wavelength-converting a signal light into a second wavelength direction opposite to the first wavelength direction using said input side wavelength converter and said output side wavelength converter as well as one of said input side wavelength converter and said output side wavelength converter reverses the order of the wavelength direction of the wavelength-division-multiplexed signal light, and said first optical amplifying repeater and said second optical amplifying repeater are arranged mutually.

5. The optical amplifying transmission system as defined in claim 1 wherein said input side wavelength converter bandwidth-compresses the bandwidth occupied by the inputting wavelength-division-multiplexed signal light and said output side wavelength converter bandwidth-expands the bandwidth occupied by the wavelength-division-multiplexed signal light output from said optical amplifier.

6. An optical amplifying apparatus comprising an optical amplifier, an input side wavelength converter for wavelength-converting an inputting signal light within an amplifying bandwidth of said optical amplifier and an output side wavelength converter for wavelength-converting a signal light output from said optical amplifier within a transmission bandwidth being different from said amplifying bandwidth.

7. An optical amplifying apparatus as defined in claim 6 wherein said wavelength converting direction of said output side wavelength converter is the reverse of that of said input side wavelength converter.

8. An optical amplifying apparatus as defined in claim 6 wherein said wavelength converting direction of said output side wavelength converter is the same with that of said input side wavelength converter, and one of said input side wavelength converter and said output side wavelength converter reverses the order of the wavelength direction of a wavelength-division-multiplexed signal light.

9. An optical amplifying apparatus as defined in claim 6 wherein said input side wavelength converter compresses the bandwidth occupied by inputting wavelength-division-multiplexed signal lights and said output side wavelength converter expands the bandwidth occupied by the wavelength-division-multiplexed signal lights output from said optical amplifier.

10. An optical transmission system comprising:
   optical transmission media for transmitting a signal light;
   at least one first wavelength converter for converting a wavelength of the signal light transmitting on said optical transmission media into a wavelength longer than a zero dispersion wavelength of said optical transmission media; and
   at least one second wavelength converter for converting a wavelength of the signal light transmitting on said optical transmission media into a wavelength shorter than the zero dispersion wavelength of said optical transmission media.

11. The optical transmission system as defined in claim 10 wherein said first wavelength converter and said second converter are disposed alternately.

12. The optical transmission system as defined in claim 10 wherein at least one of said first wavelength converter and said second wavelength converter comprises an optical amplifier for optically amplifying an input signal light and a converter for converting a wavelength of a signal light output from said optical amplifier into a predetermined wavelength.

13. The optical transmission system as defined in claim 10 wherein at least one of said first wavelength converter and said second wavelength converter comprises a converter for converting a wavelength of an input signal light into a predetermined wavelength and an optical amplifier for optically amplifying a signal light output from said converter.

14. The optical transmission system as defined in claim 10 wherein at least one of said first wavelength converter and said second wavelength converter comprises an optical amplifier, a first converter for converting a wavelength of an input signal light into a wavelength band included in an wavelength amplifying bandwidth of said optical amplifier and a second converter for converting a wavelength of a signal light output from said optical amplifier into a predetermined wavelength.

15. An optical amplifying transmission system comprising a plurality of optical fiber transmission lines each having a transmission bandwidth, and at least one optical amplifying repeater for repeating and connecting the optical fiber transmission lines, each of said at least one optical amplifying repeater comprising an optical amplifier having an amplifying bandwidth, an input side wavelength converter for wavelength-converting signal light within the transmission bandwidth to signal light within the amplifying bandwidth of said optical amplifier, and an output side wavelength converter for wavelength-converting signal light output from said optical amplifier within the amplifying bandwidth to signal light within the transmission bandwidth.

16. The optical amplifying transmission system as defined in claim 1 wherein each of the optical transmission lines has a zero dispersion wavelength outside the transmission bandwidth.

17. The optical amplifying transmission system as defined in claim 16 wherein a wavelength conversion direction of said output side wavelength converter is reverse of a wavelength conversion direction of said input side wavelength converter.

18. The optical amplifying transmission system as defined in claim 16 wherein said at least one optical amplifying repeater comprises a first optical amplifying repeater for wavelength-converting signal light on a first one of the optical fiber transmission lines in a first wavelength direction, and a second optical amplifying repeater for wavelength-converting signal light on a second one of the optical fiber transmission lines in a second wavelength direction opposite to the first wavelength direction, said first optical amplifying repeater being connected to said second optical amplifying repeater by said second one of the optical fiber transmission lines.

19. The optical amplifying transmission system as defined in claim 15 wherein said input side wavelength converter compresses the bandwidth of the signal light, and said output side wavelength converter expands the bandwidth of the signal light output from said optical amplifier.

20. An optical amplifying apparatus comprising an optical amplifier having an amplifying bandwidth, an input side wavelength converter for wavelength-converting input signal light within a transmission bandwidth into signal light within the amplifying bandwidth of said optical amplifier, and an output side wavelength converter for wavelength-converting signal light output from said optical amplifier within the amplifying bandwidth into signal light within the transmission bandwidth, said transmission bandwidth being different from said amplifying bandwidth.

21. An optical amplifying apparatus as defined in claim 20 wherein a wavelength converting direction of said output side wavelength converter is reverse of a wavelength conversion direction of said input side wavelength converter.

22. An optical amplifying apparatus as defined in claim 20 wherein a wavelength converting direction of said output side wavelength converter is the same as a wavelength converting direction of said input side wavelength converter.

23. An optical amplifying apparatus as defined in claim 20 wherein said input side wavelength converter compresses the bandwidth of the input signal light, and said output side wavelength converter expands the bandwidth of the signal light output from said optical amplifier.

24. An optical transmission system comprising:
  optical transmission media for transmitting signal light, said optical transmission media having a zero dispersion wavelength;
  at least one first wavelength converter for converting a first wavelength of the signal light transmitted on said optical transmission media into a wavelength longer than the zero dispersion wavelength of said optical transmission media; and
  at least one second wavelength converter for converting a second wavelength of the signal light transmitted on said optical transmission media into a wavelength shorter than the zero dispersion wavelength of said optical transmission media.

25. The optical transmission system as defined in claim 24 wherein each of said at least one first wavelength converter is connected to a respective one of said at least one second wavelength converter by the optical transmission media.

26. The optical transmission system as defined in claim 24 wherein each of said at least one first wavelength converter and said at least one second wavelength converter comprises an optical amplifier for optically amplifying the signal light, and a converter for converting a wavelength of signal light output from said optical amplifier into a predetermined wavelength.

27. The optical transmission system as defined in claim 24 wherein each of said at least one first wavelength converter and said at least one second wavelength converter comprises a converter for converting its respective one of said first and second wavelengths of the signal light into a predetermined wavelength, and an optical amplifier for optically amplifying signal light output from said converter.

28. The optical transmission system as defined in claim 24 wherein each of said at least one first wavelength converter and said at least one second wavelength converter comprises an optical amplifier having an amplifying bandwidth, a first converter for converting its respective one of said first and second wavelengths of the signal light into a wavelength band included in the amplifying bandwidth of said optical amplifier, and a second converter for converting a wavelength of signal light output from said optical amplifier into a predetermined wavelength.

* * * * *